US005471955A

United States Patent [19]

Dietz

[11] Patent Number: 5,471,955

[45] Date of Patent: Dec. 5, 1995

[54] FLUIDIZED BED COMBUSTION SYSTEM HAVING A HEAT EXCHANGER IN THE UPPER FURNACE

[75] Inventor: David H. Dietz, Hampton, N.J.

[73] Assignee: Foster Wheeler Energy Corporation, Clinton, N.J.

[21] Appl. No.: 238,076

[22] Filed: May 2, 1994

[51] Int. Cl.$^6$ .......... B09B 3/00

[52] U.S. Cl. .......... 122/4 D; 110/245; 165/104.16

[58] Field of Search .......... 122/4 D; 110/245; 165/104.16; 422/149

[56] References Cited

U.S. PATENT DOCUMENTS

| | | | |
|---|---|---|---|
| 4,160,009 | 7/1979 | Hamabe . | |
| 4,336,769 | 6/1982 | Daman . | |
| 4,442,795 | 3/1984 | Strohmeyer, Jr. . | |
| 4,442,796 | 4/1984 | Strohmeyer, Jr. . | |
| 4,565,139 | 1/1986 | Sage et al. | 122/4 D X |
| 4,651,653 | 3/1987 | Anderson et al. . | |
| 4,796,546 | 1/1989 | Herstad et al. . | |
| 4,813,381 | 3/1989 | Kullendorff et al. . | |
| 4,827,723 | 5/1989 | Engstrom et al. | 122/4 D X |
| 5,005,528 | 4/1991 | Virr . | |
| 5,025,755 | 6/1991 | Eickvonder et al. | 122/4 D |
| 5,033,413 | 7/1991 | Zenz et al. | 122/4 D |
| 5,094,191 | 3/1992 | Garkawe et al. | 122/4 D |
| 5,161,471 | 11/1992 | Piekos . | |

*Primary Examiner*—Denise L. Gromada
*Assistant Examiner*—Susanne C. Tinker
*Attorney, Agent, or Firm*—Marvin A. Naigur

[57] ABSTRACT

A fluidized bed combustion system in which a fluidized bed of particulate fuel material is established in a furnace. A duct is formed in the upper portion of said furnace for passing a mixture of flue gases and entrained particulate fuel material to a separator located adjacent the furnace outlet. A heat exchanger is also disposed in the upper portion of the furnace at approximately the same height as the duct so that a portion of the mixture passes over the heat exchanger and then exits via the duct and another portion of the mixture exits directly through the duct.

11 Claims, 2 Drawing Sheets

FLUIDIZED BED COMBUSTION SYSTEM HAVING A HEAT EXCHANGER IN THE UPPER FURNACE

This invention relates to a fluidized bed combustion system and method, and, more particularly, to such a system and method in which a heat exchanger is provided in the upper portion of the furnace.

Fluidized bed combustion systems are well known and include a furnace section in which air is introduced, through nozzles, or the like through a bed of particulate material, or solids, including a fossil fuel, such as coal, and a sorbent for the oxides of sulfur generated as a result of combustion of the coal, to fluidized the bed and to promote the combustion of the fuel at a relatively low temperature. These types of combustion systems are often used in steam generators in which water is passed in a heat exchange relationship to the fluidized bed to generate steam and permit high combustion efficiency and fuel flexibility, high sulfur adsorption and low nitrogen oxides emissions.

The most typical fluidized bed utilized in the furnace section of these type systems is commonly referred to as a "bubbling" fluidized bed in which the bed of solids has a relatively high density and a well-defined, or discrete, upper surface. Other types of systems utilize a "circulating" fluidized bed in which the fluidized bed density is below that of a typical bubbling fluidized bed, the fluidizing air velocity is equal to or greater than that of a bubbling bed, and the air passing through the bed combines with the gaseous products of combustion (said combination hereinafter referred to as "flue gases"), and rise in the furnace by natural convection. As a result, substantial amount of the relative fine solids are entrained by the flue gases to the extent that they are substantially saturated therewith.

Circulating fluidized beds are characterized by relatively high internal and external solids recycling which makes them insensitive to fuel heat release patterns, thus minimizing temperature variations and, therefore, stabilizing the sulfur emissions at a low level. The external solids recycling is achieved by disposing a cyclone separator adjacent an outlet located at the upper portion of the furnace to receive the mixture of flue gases and entrained solids from the fluidized bed. The solids are separated from the flue gases in the separator and the flue gases are passed to a heat recovery area while the solids are recycled back to the furnace. This recycling improves the efficiency of the separator, and the resulting increase in the efficient use of sulfur adsorbent and fuel residence time reduces the adsorbent and fuel consumption. Also, the fluidizing air is usually introduced to the bed in quantities less than required for complete combustion to reduce the formation of pollutants, such as nitrous oxides, and the remaining air for completing combustion is introduced into the furnace through overfire air ports located above the location of the fluidizing air nozzles.

In these systems, it is desirable to have a heat exchanger in the furnace to remove heat from the solids and flue gases in the furnace to better control the operating parameters of the system and make a relative efficient use of the heat. Most of these heat exchangers function as superheaters and some are in the form of heat transfer panels each formed by a plurality of water tubes that utilize water as the heat exchange medium. These panels are usually located below the above-mentioned furnace outlet and in the path of the flue gases which are at a relatively high velocity. Moreover, they are directly exposed to the radiant heat from the lower portion of the furnace.

Other heat exchanger designs in this environment utilize a pendant heat exchanger, usually in the form of a superheater formed by a plurality of vertically oriented serpentine water tubes supported from the roof of the furnace and extending below the furnace outlet. A furnace nose is formed in the furnace which directs all of the flue gases and solids through the heat exchanger and which protects the superheater from the lower furnace radiant heat.

However, in both of the above arrangements, the flue gases and the solids travel at a relative high velocity up the furnace and directly impinge on the heat exchange surfaces, i.e. the water tubes, which causes an erosion of the surfaces and ultimate damage to the tubes. Although this can be avoided, or at least ameliorated, by increasing the height of the furnace in order to reduce the velocity of the flue gases, it is very expensive.

SUMMARY OF THE INVENTION

It is therefore an object of the present invention to provide a fluidized bed combustion system and method in which a heat exchanger is provided in the interior of the furnace for removing heat from the flue gases and solids in the furnace.

It is a still further object of the present invention to provide a system and method of the above type in which erosion of the heat exchange surfaces of the heat exchanger is minimized.

It is a still further object of the present invention to provide a system and method of the above type in which the height of the furnace can be reduced when compared to prior art systems.

It is a still further object of the present invention to provide a system and method of the above type in which the heat exchanger is provided in the upper portion of the furnace where the velocity of the flue gases and solids is relatively low.

It is a still further object of the present invention to provide a system and method of the above type in which an outlet duct is formed in the upper portion of the furnace and the heat exchanger is located adjacent the duct.

Toward the fulfillment of these and other objects, a fluidized bed combustion system is provided. In which a fluidized bed of particulate fuel material is established in a furnace. A duct is formed in the upper portion of the furnace for passing a mixture of flue gases and entrained solids to a separator located adjacent the furnace outlet. A heat exchanger is also disposed in the upper portion of the furnace so that a portion of the mixture passes over the heat exchanger at a relatively low velocity and then exits via the duct and another portion of the mixture exits directly through the duct.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing wherein.

DESCRIPTION OF THE PREFERRED EMBODIMENT

Figure 1:
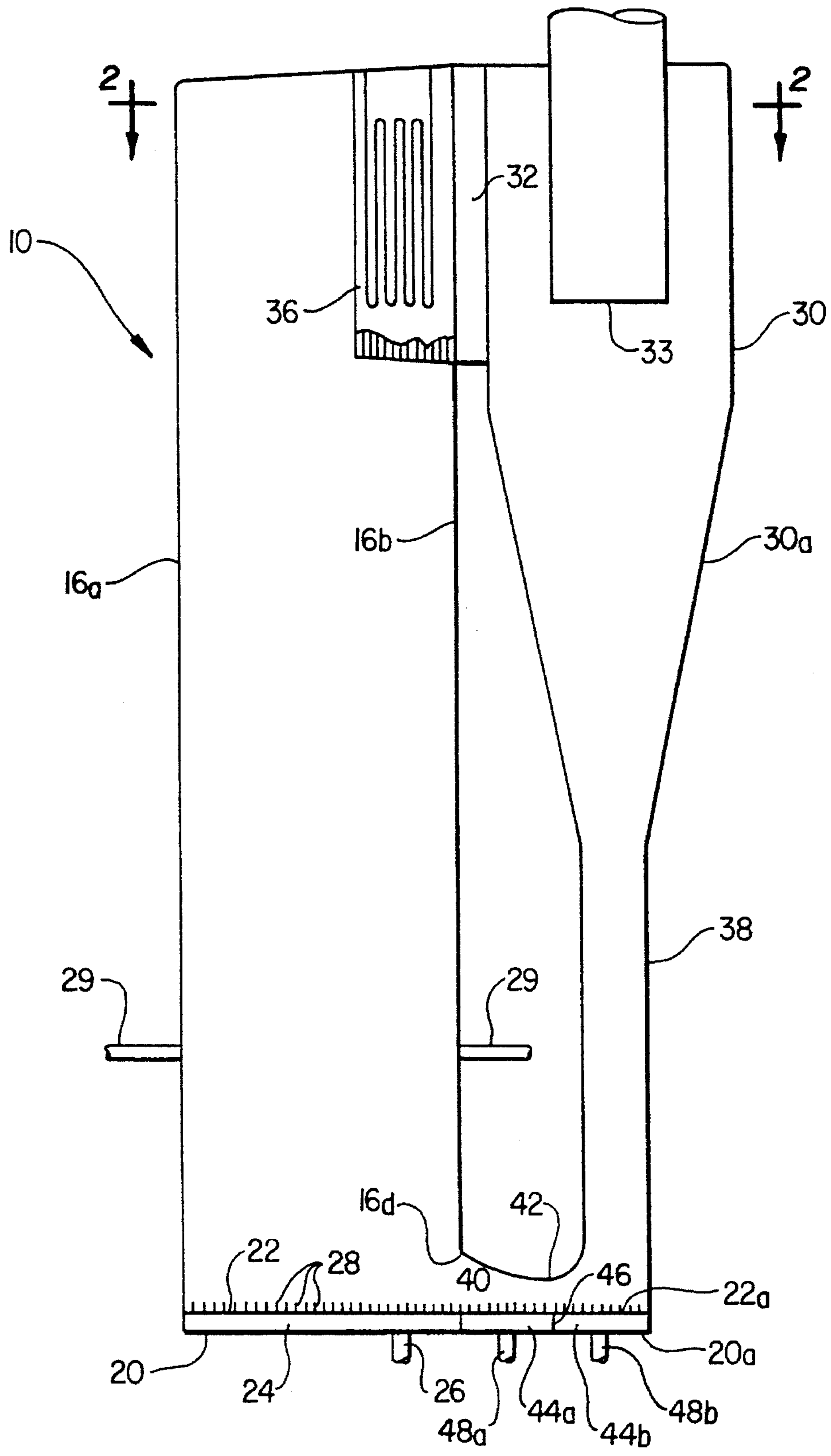
FIG. 1 is a schematic representation depicting the system of the present invention.
Figure 2:
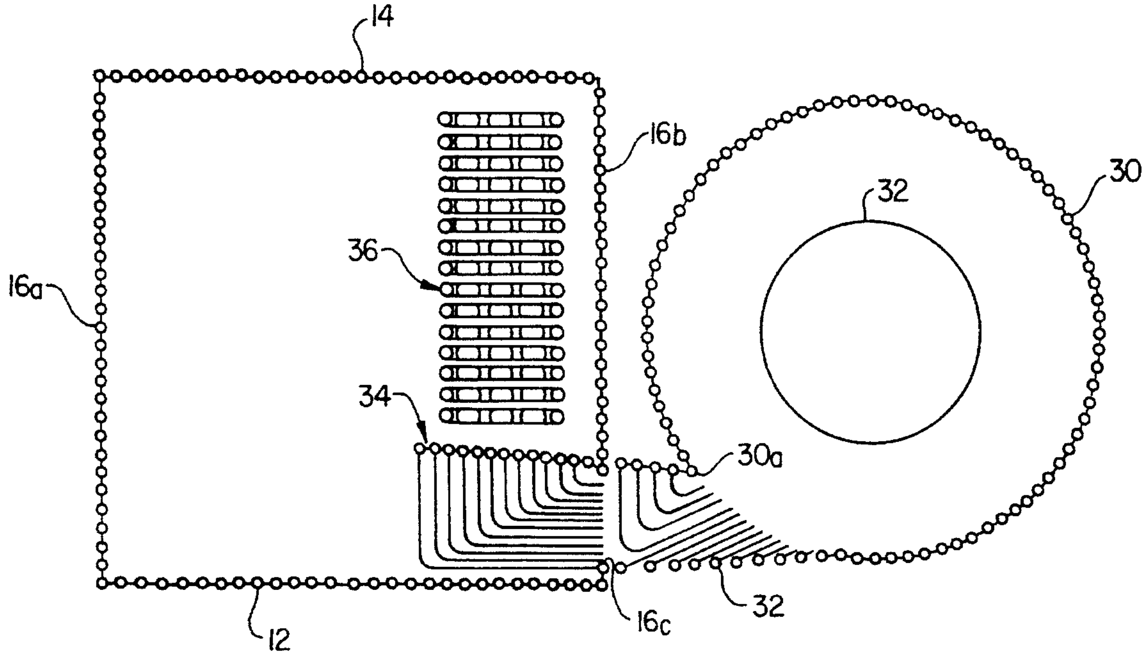
FIG. 2 is an enlarged cross-sectional view taken along the line 2—2 of FIG. 1.

Referring to FIGS. 1 and 2 of the drawings, the fluidized bed combustion system of the present invention includes an upright water-cooled furnace, referred to in general by the reference numeral 10, having a front wall 12 (FIG. 2), a rear wall 14 and two sidewalls 16*a* and 16*b*. The upper portion of the furnace 10 is enclosed by a roof 18 and the lower portion includes a floor 20.

A perforated plate, or grate, 22 extends across the lower portion of the furnace 10 for supporting the solids and extends parallel to the floor 20 to define an air plenum 24. The plenum 24 receives air from a duct 26 which, in turn, is connected to a source of air (not shown). A plurality of vertical nozzles 28 extend upwardly from the plate 22 and register with the perforations in the plate for distributing air from the plenum 24 into the furnace section 10.

It is understood that a feeder system (not shown) is provided adjacent the side wall 16a for introducing particulate fuel material into the furnace 10. Adsorbent, such as limestone, in particle form can also be introduced into the furnace 10 in a similar manner. The solids consisting of the particulate fuel and adsorbent material settle on the plate 22 and are fluidized by the air from the plenum 24 as the air passes upwardly through the plate 22. The air is introduced in quantities less than that required for complete combustion in order to reduce the formation of pollutants, and a plurality of overfire air ports, or inlets, 29 are provided in the side walls 16*a* and 16*b* at a height well above the nozzles 28 to introduce additional air into the furnace to complete the combustion. The combustion of the fuel particles generates combustion gases which combine with the unreacted air, to form flue gases which rise in the furnace 10 by convection and entrain a portion of the solids material, as will be described.

A cylindrical cyclone separator 30 is located adjacent the furnace 10 and a duct 32 extends from an outlet opening 16*c* (FIG. 2) provided in the side wall 16*b* of the furnace 10 to an inlet opening 30*a* provided through the wall of the separator 30. The separator 30 thus receives the flue gases and the entrained solids from the furnace 10 and operates in a conventional manner to disengage the solids from the flue gases due to the centrifugal forces created in the separator.

The separated flue gases in the separator 30, which are substantially free of solids, pass from the separator through a vertical duct 33 having a portion extending in the separator for receiving the separated flue gases, and a portion projecting from the separator for passing the flue gases to a heat recovery section (not shown) for further treatment.

Figure 3:
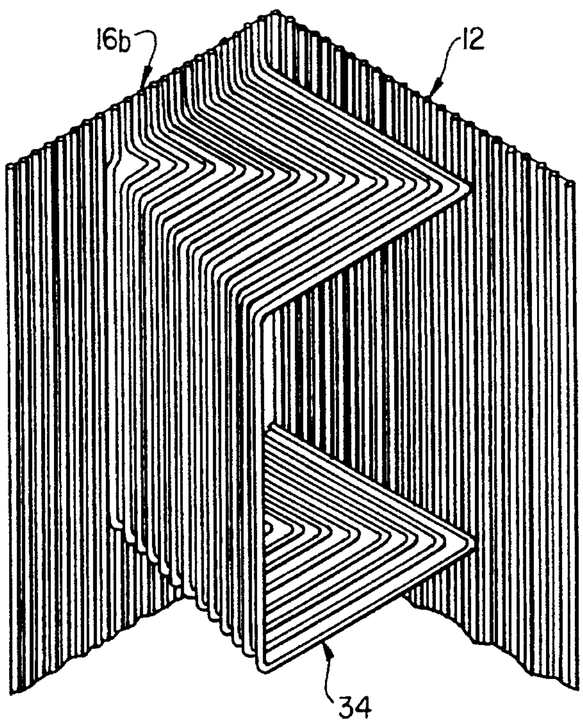
FIG. 3 is an enlarged perspective view of a portion of the system of FIG. 1.

As shown in FIG. 2, the furnace walls 12, 14, 16*a* and 16*b*, as well as the cylindrical wall of the separator 30, all are formed by a plurality of vertically extending, spaced, parallel water tubes, with the tubes being connected together by a plurality of continuous fins extending between adjacent tubes to render the furnace 10 and the separator 30 gas-fight. A plurality of the tubes forming the cylindrical wall of the separator 30 are selectively bent to form the inlet opening 30*a* and the duct 32. As shown in FIGS. 2 and 3, the tubes forming the upper portion of the sidewall 16*b* of the furnace 10 are also bent in a manner to form the outlet opening 16*c* and to form an internal duct 34 adjacent the from wall 12. Since this technique of bending tubes to form openings and ducts is taught in the prior art such as, for example, in U.S. Pat. No. 5,094,192, assigned to the assignee of the present invention, the disclosure of which is incorporated by reference, it will not be described in any further detail.

As shown in FIGS. 1 and 2, a heat exchanger, shown in general by the reference numeral 36, is disposed in the upper portion of the furnace 10 and between the duct 34 and the rear wall 14. The heat exchanger 36 consists of a plurality of vertically-extending, spaced, parallel panels, each formed by a serpentine water tube, which are hung from the roof 18 in a conventional manner.

A hopper section 30*a* extends from the lower end of the separator 30 and is connected to a dipleg 38 which extends downwardly to the level of the floor 20 of the furnace section 10. As shown in FIG. 1, a duct 40 connects the lower end portion of the dipleg 38 to an opening 16*d* in the lower portion of the rear wall 16*b*. The duct 40 is formed by an extension 22*a* of the plate 22, by a curved plate 42 connecting the wall 16*b* to the dipleg 38, and by two side walls (not shown). The duct 40 thus transfers the separated solids from the dipleg 38 to the furnace 10 and also functions to prevent backflow of solids from the furnace to the dipleg 38 in a manner to be described.

An extension 20*a* of the floor 20 extends below, and parallel to, the extension 22*a* of the plate 22 to form a plenum which is divided into two sections 44*a* and 44*b* by a vertical partition 46. The plenum sections 44*a* and 44*b* receive air from two ducts 48 and 48*b*, respectively, which, in turn, are connected to the above-mentioned air source. A plurality of vertical nozzles 28 also extend upwardly from the plate extension 22*a* and register with the perforations in the latter plate for introducing air from the plenum sections 44*a* and 44*b* into the duct 40.

As better shown in FIG. 1, the plate 42 curves downwardly from the front wall of the dipleg 36 towards the wall 16*b* and then upwardly to the latter wall which forms a necked-down portion. Due to the upwardly curved portion of the plate 42, the cross-sectional area of the duct 40 increases in a direction towards the furnace 10, for reasons to be described. Further details of the duct 40 are disclosed in co-pending application Ser. No. 089982 filed on Jul. 6, 1993 and assigned to the assignee of the present invention, with the disclosure of this application being incorporated by reference.

It is understood that the walls defining the dipleg 38 and the duct 40 are also formed by a plurality of spaced tubes having continuous fins extending from diametrically opposed portions as described above.

It is understood that a drain pipe, or the like, may be associated with the plate 22 as needed for discharging the particulate material from the furnace 10. Also, a steam drum (not shown) may be provided along with a plurality of headers disposed at the ends of the various water-tube walls described above which, along with downcomers, water pipes, etc., establish a steam and water flow circuit including the aforementioned water tubes. Thus, water is passed, in a predetermined sequence through this flow circuitry, to convert the water to steam and heat the steam by the heat generated by combustion of the particulate fuel material in the furnace 10.

In operation, particulate fuel material and particulate sorbent material are introduced into the furnace 10. Air from an external source is introduced at a sufficient pressure into the plenum 24 so that the air passes through the nozzles 28 at a sufficient quantity and velocity to fluidized the particles in the furnace 10. The quantity of air so introduced is less that required for complete combustion and the remaining quantity need to attain the latter is introduced through the overfire air inlets 29.

A lightoff burner (not shown), or the like, is provided to ignite the fuel material, and thereafter the material is self-combusted by the heat in the furnace 10. A quantity of solids consisting of a homogenous mixture of the fuel particles and the adsorbent particles, in various stages of combustion and reaction, is thus formed in the furnace 10.

The flue gases pass upwardly through the furnace 10 and entrain, or elutriate, a portion of the solids. The quantity of solids introduced into the furnace 10 and the quantity of air introduced into the interior of the furnace is established in accordance with the size of the solids so that a dense bed is formed in the lower portion of the furnace 10 and a circulating fluidized bed is formed in the upper portion thereof, i.e. the solids are fluidized to an extent that substantial entrainment or elutriation thereof is achieved. Thus the density of the solids is relatively high in the lower portion of the furnace 10, decreases with height throughout the length of the furnace and is substantially constant and relatively low in the upper portion of the furnace. This technique is more specifically disclosed in U.S. Pat. Nos. 4,809,623 and No. 4,809,625, both assigned to the assignee of the present invention, the disclosures of which are incorporated by reference.

The flue gases passing into the upper portion of the furnace 10 are substantially saturated with the solids and rise to the upper portion of the furnace by natural convection. A portion of the flue gases, with their entrained solids, pass across the heat exchanger 36 and then enter the duct 34 before exiting, via the outlet opening 16*c*, to the duct 32 and therefore into the separator 30. The remaining portion of the flue gases and entrained solids pass directly into the duct 34 and therefore directly into the separator 30 without passing across the heat exchanger 36.

In the separator 30, the solids are separated from the flue gases and the latter pass from the separator 30, via the duct 32, to a heat recovery area, or the like. The separated solids from the separator 30 passes downwardly through the hopper section 30*a* and into the dipleg 38 where they build up in the lower portion of the dipleg and passes into the duct 40. Fluidizing air is introduced, via the ducts 48*a* and 48*b*, into the plenum sections 44*a* and 44*b*, respectively, and to the nozzles 28 in the duct 40 to fluidized the solids therein. Air is introduced into the plenum sections 44*a* and 44*b* at different velocities for the reasons described in the above-referenced patent application.

A pressure head is formed by the level of solids building up in the dipleg 38 and a pressure seal is established sufficient to prevent backflow of the solids from the furnace 10, through the duct 40 and to the separator 30. The design is such that the height of the solids corresponds to, and varies with, the pressure drop from the furnace to the separator.

As also described in detail in the above-referenced patent application the relatively dilute bed in one section of the duct 40 absorbs pressure pulses from the furnace 10 and compensates for frictional losses to promote the flow of the solids from the dipleg 38 to the furnace 10; while the relatively dense led in another duct section dampens the pressure fluctuations.

Feedwater is introduced to and circulated through the flow circuit described above including the heat exchanger 36 in a predetermined sequence to convert the feed water to steam, with the heat exchanger preferably functioning as a superheater.

According to a feature of the present invention, the velocity of the flue gases, with their entrained solids, is considerably reduced when they reach the heat exchanger 36 in the upper portion of the furnace 10. This, plus the fact that a significant portion of the flue gases and entrained solids pass directly into the duct 34 without encountering the heat exchanger 36, protects the heat exchanger from erosion as described in connection with the prior art systems above.

The present invention thus enjoys several advantages. For example, the heat exchanger 36 and the duct 34 are located in the upper portion of the furnace 10 where the velocity of the flue gases and solids is relatively low thus reducing the erosion on the outer surfaces of the tubes forming the heat exchanger 36 by reducing the magnitude of the impact on the latter tubes. Also, this reduction in erosion enables the height of the furnace to be reduced. Moreover, since a portion of the flue gases, with their entrained solids, will by-pass the heat exchanger 36, some of the entrained solids will disengage from the flue gases as the flow of the gases decelerates as the gases pass upwardly in the furnace 10. The disengaged solids will fall back below the heat exchanger 36 into the region of high solids loading. The resulting constant up-and-down movement of the solids will maintain a hot environment around the heat exchanger 36 thus assuring optimum heat transfer.

It is understood that variations, modifications, changes and substitutions may be made in the foregoing without departing from the scope of the invention. Also some features of the invention will be employed without a corresponding use of other features. Accordingly, it is appropriate that the appended claims be construed broadly and in a manner consistent with the scope of the invention.

What is claimed is:

1. A fluidized bed combustion system including a furnace for receiving combustible material and comprising a floor and four upright walls extending perpendicular to said floor and formed at least in part by a plurality of tubes, means for introducing air in the lower portion of said furnace to establish a fluidized bed of said material including fuel in said lower portion of said furnace, a separator disposed adjacent one wall of said furnace, a furnace interior duct in the upper portion of said furnace interior and adjacent said one wall for receiving a mixture of flue gases from the combustion of said fuel and entrained solids from said fluidized bed, an exterior duct exterior to said furnace and means connecting said furnace interior duct and said separating means for passing said mixture of flue gases and entrained solids to said separating means for separating said solids from said flue gases, a plurality of heat exchange tubes disposed in said upper portion of said furnace interior and adjacent said furnace interior duct for removing heat from a portion of said mixture of flue gases and entrained solids, and means for passing water through said tubes to heat said water, said mixture passing from the lower portion of said furnace upwardly in said furnace, and into said furnace interior duct for passage to said separator.

2. The system of claim 1 wherein the upper portions of a portion of the tubes forming said one wall are bent into the interior of said furnace to form said furnace interior duct.

3. The system of claim 2 wherein said furnace interior duct comprises a substantially horizontal roof extending from and perpendicular to said one wall, a substantially horizontal floor extending from and perpendicular to said one wall and a substantially vertical wall connecting said roof and said floor; said roof, said floor and said latter wall all being formed by said bent tube portions.

4. The system of claim 3 wherein each of said bent tube portions has a first portion extending from and perpendicular to said wall and parallel to said floor, a second portion extending from and perpendicular to said first tube portion and parallel to said floor, a third portion extending from and perpendicular to said second tube portion and perpendicular to said floor, a fourth portion extending from and perpendicular to said third portion and parallel to said floor and a fifth portion extending from and perpendicular to said fourth portion, parallel to said floor and towards said wall.

5. The system of claim 1 wherein said separator is formed by at least one vertically extending wall, at least a portion of which is formed by a plurality of tubes for receiving fluid, the upper portions of a portion of said tubes being bent outwardly from said latter wall to form said exterior duct.

6. The system of claim 1 wherein said furnace interior duct and said heat exchanger are at the approximately the same height in said furnace, with said heat exchanger being horizontally spaced from said furnace interior duct.

7. The system of claim 1 wherein a first portion of said mixture passes in a heat exchange relation to said heat exchanger and then passes through said duct and the remaining portion of said mixture passes directly through said furnace interior duct.

8. The system of claim 1 wherein said heat exchanger comprises a plurality of heat exchange tubes extending downwardly from the roof of said furnace.

9. The system of claim 1 further comprising means for introducing additional air into said furnace at a location above the location of the introduction of said first-mentioned air, said duct and said heat exchanger being disposed above said latter introducing means.

10. The system of claim 1 further comprising means extending from said separating means for receiving said separated solids and introducing said separated material back to the lower portion of said furnace.

11. The system of claim 1 wherein said receiving and introducing means comprises first conduit means extending from said separating means for receiving said separated material, second conduit means connecting said first conduit means to said furnace, whereby said solids build up in said first conduit means to establish a pressure seal for preventing the backflow of said separated solids from said furnace to said separating means.

* * * * *

UNITED STATES PATENT AND TRADEMARK OFFICE

CERTIFICATE OF CORRECTION

PATENT NO. : 5,471,955

DATED : December 5, 1995

INVENTOR(S) : David H. Dietz

It is certified that error appears in the above-indentified patent and that said Letters Patent is hereby corrected as shown below:

Col. 2, line 42, "provided. In" should be --provided in--.

Col. 3, line 56, "gas-fight" should be --gas-tight--.

Col. 4, line 31, "dipleg 36" should be --dipleg 38--.

Col. 4, line 62, "fluidized" should be --fluidize--.

Col. 5, line 41, "fluidized" should be --fluidize--.

Signed and Sealed this

Sixteenth Day of April, 1996

*Attest:*

Bruce Lehman

BRUCE LEHMAN

*Attesting Officer* *Commissioner of Patents and Trademarks*